July 26, 1938.    J. GOOSTRAY    2,124,527
PISTON FOR HORIZONTAL CYLINDERS
Filed Feb. 10, 1937
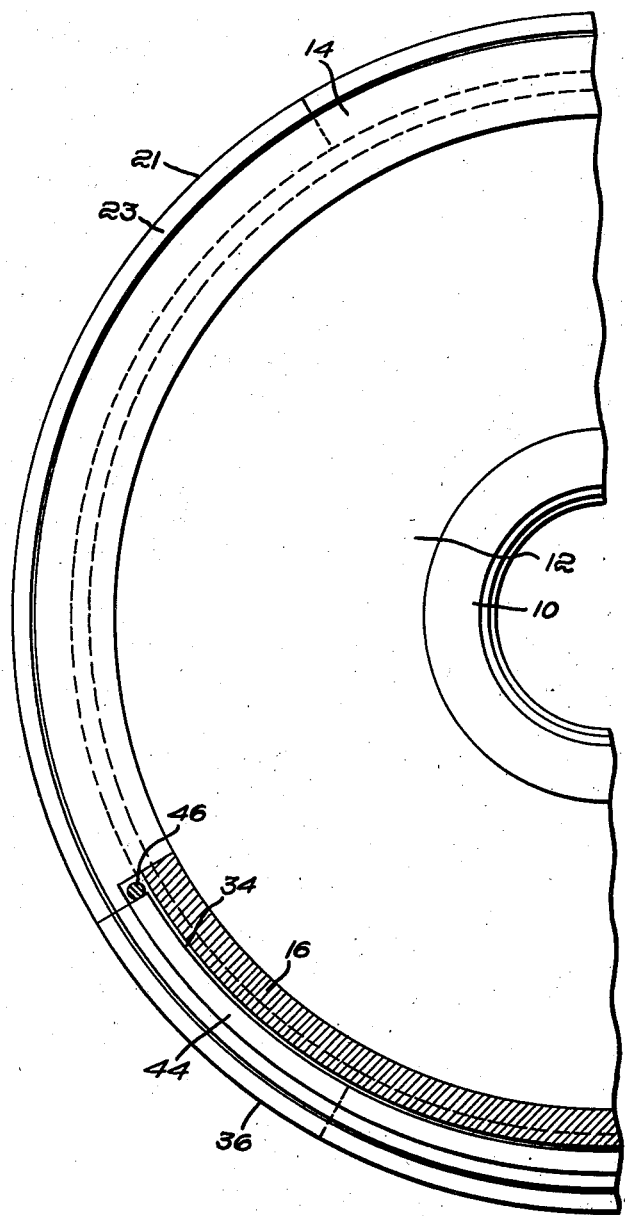
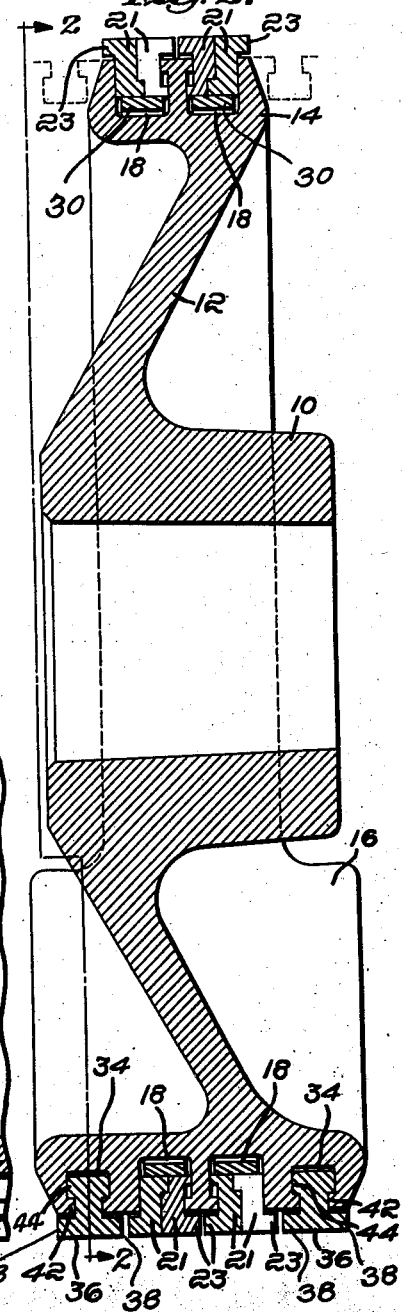
Inventor:
Joseph Goostray,
Attys Patented July 26, 1938

2,124,527

UNITED STATES PATENT OFFICE 2,124,527

PISTON FOR HORIZONTAL CYLINDERS

Joseph Goostray, Milton, Mass., assignor to Hunt-Spiller Manufacturing Corporation, Boston, Mass., a corporation of Massachusetts Application February 10, 1937, Serial No. 125,101

1 Claim. (Cl. 309—7)

This invention relates to pistons and more particularly to those operating in horizontal cylinders such as the cylinders of locomotives, and the object is to provide a construction whereby the life of the piston may be indefinitely prolonged at low maintenance cost.

My invention will be well understood by reference to the following description of specific embodiments thereof taken in connection with the accompanying drawing, wherein:—

Fig. 1 is a part end view, part transverse section of half of the piston, being a section on the line 1—1 of Fig. 2;

Fig. 2 is an axial vertical section through the piston.

Referring to the figures, I have there shown a piston having the usual hub 10, web 12 and circumferential rim 14 and provided with a so-called shoe or trailer 16 comprising an axially extended portion at the lower part of its periphery, such portion being herein shown as extending circumferentially for about 120°.

The piston may be circumferentially grooved to receive packing rings and I have herein shown two grooves 18, each receiving segmental packing rings 21 of the type described in the patent to Gilmer 1,671,526, May 29, 1928, but provided with flanges 23 which overlie the peripheral face of the piston at the sides of the grooves 18 so that the bearing face of the packing is substantially coextensive with the width of the rim of the piston 14 exclusive of the extensions thereof forming the shoe or trailer. In other words, the upper two-thirds of the circumference and the corresponding circumferentially aligned portion of the remaining third are covered by the renewable and removable rings 21. Springs 30 may be positioned beneath the segmental rings to maintain the packing expanded. This construction, however, is merely an example of any suitable arrangement of packing rings encircling the piston body.

In accordance with my invention I provide the trailer 16 at either side of the packing rings 21 with segmental recesses 34 in which are set removable segmental bearing pieces 36. In the example of the invention illustrated, these pieces are a single element extending throughout substantially a third of a circumference. They are preformed to shape and may be accurately machined to the proper dimensions. In order to retain these bearing pieces in position the grooves 34 located in the lateral portions of the trailer are undercut, in the example illustrated on both sides, being provided with overhanging flanges 42 beneath which are received basal flanges 44 on the segmental bearing pieces 36, which latter are thus interlocked against removal in a radial direction from the recesses. To permit assembly of the bearing segments when they are formed in one piece as shown, the groove 34 may open out through an end of the trailer 16, as shown in Fig. 1, so that the bearing piece 36 may be slid in in a circumferential direction and may be retained by suitable means closing the open end, as, for example, a transverse pin 46.

Referring to Fig. 2, it will be seen that the position of the grooves 34 is such that if they were projected or continued throughout a circle, they would fall entirely outside of the narrower portion of the rim of the piston, as indicated by dotted lines at the upper portion of that figure. This permits all the grooves to be cut on a boring mill. The tools cut the grooves 34 and in the upper portion of the piston (Fig. 2) move where the dotted lines are drawn and do not make contact with the piston rim. The open ends of the grooves 34 thus formed may be closed in any suitable manner, as, for example, by pins 46.

When the piston is in operation the weight of the same is in great measure supported by the segmental bearing pieces 36 which protect the expensive piston body proper from wear. To further increase the protection afforded to the piston body and to provide an increased period of wear for these bearing pieces themselves they may be provided with flanges 38 adapted to overlie the face of the piston body. In the example shown the flanged faces of these segments in cooperation with the face of the packing rings 21 cover substantially the entire face of the trailer.

I am aware that the invention may be embodied in other specific forms without departing from the spirit or essential attributes thereof, and I therefore desire the present embodiment to be considered in all respects as illustrative and not restrictive; reference being had to the appended claim rather than to the foregoing description to indicate the scope of the invention.

I claim:

A piston for a horizontal steam cylinder having a segment of its periphery at the lower portion of greater width than the remaining portion, packing rings encircling the piston, the lateral portions of said segment having undercut circumferentially extending recesses opening at at least one end of said portions and preformed segmental bearing elements shaped to provide for their entry into the open end of said recesses and to be radially interlocked therewith.

JOSEPH GOOSTRAY.